United States Patent [19]

Watari et al.

[11] Patent Number: 4,601,054

[45] Date of Patent: Jul. 15, 1986

[54] PATTERN DISTANCE CALCULATING EQUIPMENT

[75] Inventors: Masao Watari; Seibi Chiba, both of Tokyo, Japan

[73] Assignee: Nippon Electric Co., Ltd., Tokyo, Japan

[21] Appl. No.: 757,929

[22] Filed: Jul. 23, 1985

Related U.S. Application Data

[63] Continuation of Ser. No. 439,483, Nov. 5, 1982, abandoned.

[30] Foreign Application Priority Data

Nov. 6, 1981 [JP] Japan ................. 56-178055

[51] Int. Cl.⁴ .................... G06K 9/62; G10L 5/06
[52] U.S. Cl. ........................... 382/1; 381/42; 381/43; 382/34; 382/36
[58] Field of Search ................. 382/1, 34, 36; 381/40–50

[56] References Cited

U.S. PATENT DOCUMENTS 3,700,815 10/1972 Doddington et al. ............. 381/42
4,292,471 9/1981 Kuhn et al. ..................... 382/36
4,403,114 9/1983 Sakoe ........................... 381/42

Primary Examiner—Leo H. Boudreau

Attorney, Agent, or Firm—Sughrue, Mion, Zinn, Macpeak & Seas

[57] ABSTRACT

A pattern recognition apparatus for recognizing spoken words of a nonspecific speaker or of a specific speaker. A reference pattern composed of a sequence of feature vectors, each composed of n feature parameters, $b_i$, is stored. The reference pattern represents a form of average of said words to be recognized as determined by multiple reference speakers speaking the same words or by the specified speaker speaking said words several times. A deviation pattern composed of a sequence of feature vectors composed of n feature parameters, $w_i/2$, is stored. The deviation pattern is a measure of the deviation from the reference of the repeated utterances of the reference speakers or the specified speaker. An input pattern, representing the utterances of a speaker, is composed of a sequence of feature vectors, each composed of n feature parameters, $a_i$, and is stored. A measure of the similarity of the input and reference patterns is calculated, taking into account the deviation pattern, according to one of several possible distance formulae. Basically, a distance parameter calculated for each corresponding input, reference and deviation parameter is set to zero value if the input parameter is inside the deviation range of the reference parameter, and is otherwise calculated to be a finite value.

12 Claims, 9 Drawing Figures

PATTERN DISTANCE CALCULATING EQUIPMENT

This is a continuation of application Ser. No. 439,483 filed Nov. 5, 1982 now abandoned.

BACKGROUND OF THE INVENTION

1. Field of the Invention

The present invention relates to distance calculating equipment for use in pattern recognition apparatus and, more particularly, to distance calculating equipment which have a low erroneous recognition rates for pattern recognition of voice, characters such as letters and digits even under a variety of conditions (or fluctuations).

2. Description of the Prior Art

In pattern recognition apparatus, the similarity between a pattern to be recognized, i.e. an input pattern, and each of a plurality of known reference patterns is calculated in terms of a concept of distance on the basis of a feature vector, which is composed of feature parameters intrinsic to respective patterns, and the reference pattern calculated to have the shortest distance is recognized as the pattern of the input pattern. In a word voice recognition apparatus, for example, a voice pattern is expressed as a time sequence of a feature vector (e.g., the spectrum information which is obtained by a spectrum analysis using a filter bank). Likewise, a sequence of feature vectors of reference patterns for each of a plurality of known words is achieved in advance, and a word having a reference pattern which is most similar to the input pattern is selected from those plural reference patterns by the distance calculation. At this time, it is necessary to correct the time fluctuations of the input pattern to fit the input pattern for the reference pattern by time expansion or compression. This correction of the time fluctuations is conducted by the so-called "time-normalized matching method". The time normalized matching method and voice recognition apparatus are disclosed in detail in the U.S. Pat. No. 3,816,722 assigned to the same assignee herein. As is well known in the art, the voice recognition apparatus is constructed of a voice analyzing unit, a reference pattern memory unit and a pattern matching unit. In the voice analyzing unit, spectrum analysis is performed by means of a filter bank, for example, and simultaneously a voice section is detected so that a sequence of n-dimensional feature vectors composed of an n number of feature parameters for each frame is obtained. On the other hand, a user speaks in advance words to be used and stores a sequence of similar feature vectors, which are given from the voice analyzing unit, as reference patterns in the reference pattern memory unit. The voice to be recognized is converted by the voice analyzing unit into a sequence of feature vectors, which are then fed as an input pattern to the pattern matching unit. In this pattern matching unit, the input pattern is matched with each of the reference patterns of a variety of words, which are stored in advance, so that the word class of the reference pattern, which is found to match best, is used as a recognition result.

The pattern matching is performed, as is detailed in the above-specified U.S. Patent, by the time normalized matching method, in which a non-linear expansion or compression is conducted along the time axis of the reference pattern. The distance between the feature vectors of the input pattern and the reference pattern is calculated and the sum value is used as a measure of similarity. An expansion or compression which minimizes the sum value can be determined by a dynamic programming method. The similarity is thus calculated on the basis of the distance between the feature vectors.

There are several ways of mathematically expressing the distance between feature vector $A=(a_1, a_2, \ldots, a_n)$ and feature vector $B=(b_1, b_2, \ldots, b_n)$. They include a Chebychev distance which is expressed by equation (1), a Euclid distance which is expressed by equations (2) and (3), and a correlated distance which is expressed by equation (4):

$$d_1(A, B) = \sum_{i=1}^{n} |a_i - b_i| \tag{1}$$

$$d_2(A, B) = \sum_{i=1}^{n} (a_i - b_i)^2 \tag{2}$$

$$d_3(A, B) = \sqrt{\sum_{i=1}^{n} (a_i - b_i)^2} \tag{3}$$

and $$d_4(A, B) = \sum_{i=1}^{n} a_i \cdot b_i. \tag{4}$$

Since a voice has minute fluctuations for each utterance, on the other hand, erroneous recognitions are increased if the reference pattern is determined in advance as a pattern. Two methods have been proposed to enlarge the recognition rate even where fluctuations are present. According to one method a plurality of reference patterns covering the aforementioned fluctuations are prepared for each word. According to the other method an average pattern is determined from the plural reference patterns and is used as a reference pattern representative of them. Reference should be made to, for example, "Speech Recognition by Machine: A Review", PROCEEDINGS OF THE IEEE, VOL. 64, No. 4, APRIL 1976, from pp. 501 to 531, written by D. RAJ REDDY, or "Practical Applications of Voice Input to Machine", PROCEEDINGS OF THE IEEE, VOL. 64, No. 4, APRIL 1976, from pp. 487 to 501, written by THOMAS B. MARTIN.

A disadvantage of the former method is that the storage capacity of the memory has to be increased and the number of distance calculations is increased because the number of the reference patterns to be prepared is increased.

On the other hand, a disadvantage of the latter method is that the recognition rate is lowered although the number of the reference patterns is not increased. Generally, pattern distributions of similar words are close to each other and each range of the pattern distribution has various (wider or narrower) ranges. As a result, if one average is used as the reference pattern, the wider range pattern of a word and the narrower range pattern of the similar word come close to each other so that the distance between the pattern to be recognized and the average pattern of the narrower pattern becomes smaller than that between the pattern to be recognized and the average pattern of the wider pattern thereby to cause erroneous recognitions in case the pattern to be recognized belongs to the wider patterns and is located in the vicinity of the ends of the same.

The discussion thus far described also applies to the case for recognitions of not only voices but also letters, digits and so on. In the case of the letter recognitions, the aforementioned fluctuations correspond to the positional deviations of the characters or to the differences in the characters intrinsic to the writer.

SUMMARY OF THE INVENTION

It is, therefore, an object of the present invention to provide pattern distance calculating equipment which can enhance the recognition rate even if fluctuations are present in input patterns.

Another object of the present invention is to provide pattern distance calculating equipment which can enhance the recognition rate and reduce storage capacity and the number of calculations even where fluctuations appear in the input patterns.

Still another object of the present invention is to provide pattern distance calculating equipment which has the advantages thus far described and which is to be used in voice recognition apparatus for a specified speaker or an unspecified speaker.

A further object of the present invention is to provide pattern distance calculating equipment which has the advantages thus far described and which is to be used in a speaker recognition apparatus.

According to one aspect of the present invention, there is provided pattern distance calculating equipment comprising an input pattern memory storing an input pattern which is represented by a sequence of feature vectors, each composed of a predetermined number n (i.e., a positive integer) of feature parameters, a reference pattern memory storing a reference pattern which is represented by a sequence of feature vectors each composed of an n number of feature parameters of the same type as that of said input pattern, a deviation pattern memory storing a deviation pattern indicative of a predetermined fluctuation range for each of said n number of the feature parameters of said reference pattern, and distance calculating means for calculating the distance between said input pattern and said reference pattern to determine that the distance is zero or a predetermined value when the difference between the value of the feature parameter of said input pattern at a certain time and the value of the feature parameter of said reference pattern at a corresponding time is within a fluctuation range determined for each of said feature parameters of said deviation pattern at said corresponding time, and to determine that the distance is such a value as is given by a predetermined distance concept, when said difference is outside said fluctuation range.

DESCRIPTION OF THE PREFERRED EMBODIMENTS

Although the present invention can be applied to a variety of pattern recognitions, as has been described hereinbefore, the following description is directed to the case in which the present invention is applied to word voice recognition. The algorithm for the voice recognition and the construction therefor are disclosed in detail in the aforementioned U.S. Pat. No. 3,816,722, and their details are omitted here.

A voice spoken is analyzed by a voice analyzing unit, and starting and ending points are detected. The sequence of the feature vectors of an input pattern is obtained by determining the feature vectors $A^1, A^2, \ldots, A^{ka}, \ldots,$ and $A^{ae}$ for each predetermined frame time (which is usually several tens msec). Here, the suffixes $1, 2, \ldots, ka, \ldots,$ and ea designate frame numbers (or times), and if an n number of feature parameters $a_1, a_2, \ldots,$ and $a_n$ are determined, $A^{ka}$ is represented as: $A^{ka} = (a_1{}^{ka}, a_2{}^{ka}, \ldots, a_n{}^{ka})$.

Each of a plurality of predetermined voices is analyzed to determine a sequence of feature vectors to determine a reference pattern and a deviation pattern by the following procedures. The plural predetermined input voices may be input voices for each speech of a specified speaker in case the present invention is applied to either a voice recognition system for a specified speaker or a speaker recognition system, or input voices of a plurality of different speakers in case the present invention is applied to a voice recognition system for an unspecified speaker.

Figure 1:
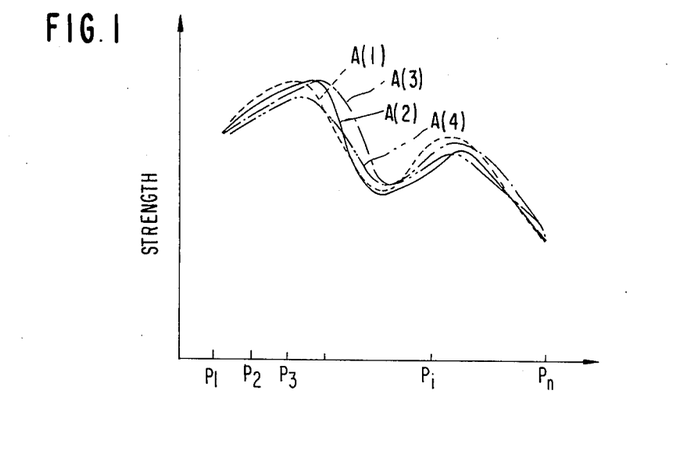
FIG. 1 is a diagram illustrating the fluctuations of the feature vectors of an input voice.

For example, in case the present invention is applied to a voice recognition sytstem for a specified speaker, the speaker speaks a necessary word several times so that the feature vectors for each of the aforementioned frames are obtained for each utterance. FIG. 1 illustrates one example of the distribution of the feature parameters (or spectra) of each utterance A(1), A(2), A(3) and A(4) thus made. As is apparent from the Figure, the range (i.e., the fluctuating range) of the distribution of the feature parameters is not uniform over the frequency band but is different for each frequency. It is therefore necessary to determine the most proper reference pattern and the deviation pattern for each frequency. It is desirable to experimentally determine the proper reference and deviation patterns. One method includes determining the average and the standard deviation values of the strengths of each of the feature parameters ($P_1, P_2, \ldots,$ and $P_n$) (e.g., the frequencies) so that the average value may be used as a component of the reference pattern whereas the constant-folds of the standard deviation value may be used as a component of the deviation pattern. The center value, the maximum and the minimum values are determined for the respective feature parameters so that the center value may be used as a component of the reference pattern whereas the constant-folds of the difference between the maximum and the minimum values may be used as a component of the deviation pattern. The sets of the components of the reference pattern and the deviation pattern for each frame are the reference vectors and the deviation vectors, respectively.

The sequence of the feature vectors composing the reference pattern thus obtained is expressed in the following manner:

$$B^1, B^2, \ldots, B^{kb}, \ldots, \text{and } B^{eb},$$

wherein:

$$B^{kb} = (b_1^{kb}, b_2^{kb}, \ldots, \text{and } b_n^{kb}).$$

On the other hand, the sequence of the feature vectors composing the deviation pattern is made to correspond to each frame of the reference pattern and is expressed by $W^1, W^2, \ldots, W^{kb}, \ldots,$ and $W^{eb}$.

The reference pattern and the deviation pattern thus defined are prepared in the number corresponding to the words to be recognized, and the matching between the input pattern and the reference pattern taking the deviation pattern of each word into consideration is performed by the time normalized matching which is disclosed in the foregoing U.S. Pat. No. 3,816,722. Since the present invention is featured in the pattern distance calculating system, those recognition procedures are omitted, and only the calculation of the distance between the input pattern and one reference pattern will be described for simplicity.

The distance D between the feature vectors at the frame time (or number) ka of the input pattern and at the time (or number) kb of the reference pattern is calculated by the following equations (8), (9) and (10):

$$D = F_1(A^{ka}, B^{kb}, W^{kb}) \quad (8)$$

$$D = \sum_{i=1}^{n} d_i \quad (9)$$

$$\begin{cases} d_i = |b_i^{kb} - a_i^{ka}| - w_i^{kb}/2 \\ \quad \text{if } |b_i^{kb} - a_i^{ka}| \geq w_i^{kb}/2, \\ = 0 \\ \quad \text{if } |b_i^{kb} - a_i^{ka}| < w_i^{kb}/2 \end{cases} \quad (10)$$

Wherein $F_1$ designates a distance function.

Figure 2:
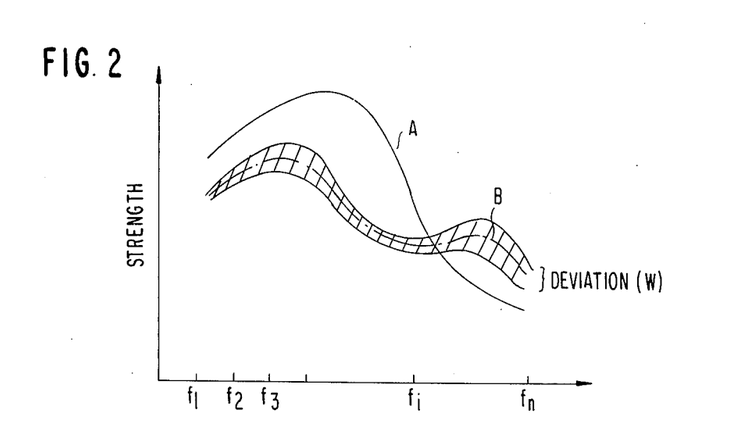
FIG. 2 is a diagram illustrating the relationship between the fluctuating range of the reference pattern and the input pattern.
Figure 3:
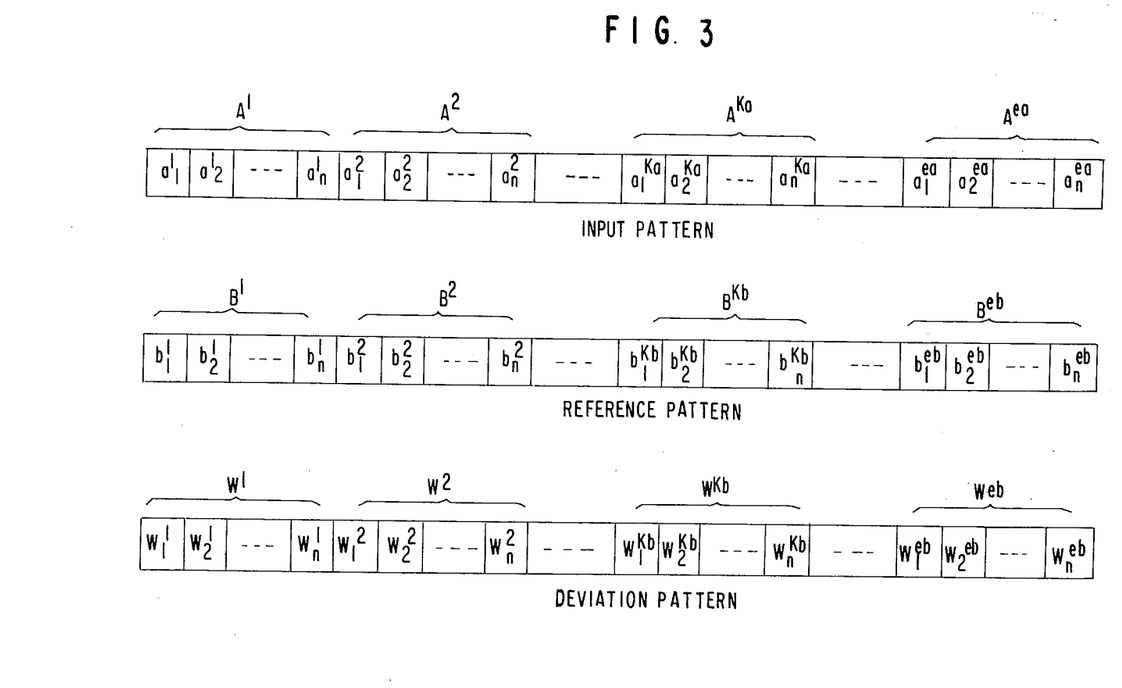
FIG. 3 is a diagram illustrating the time relationships in the feature vectors among the input pattern, the reference pattern and the deviation pattern.

In the above distance calculations, the distance $d_i$ between the i-th feature parameter $a_i^{ka}$ of the ka-th frame of the input pattern and the i-th feature parameter $b_i^{kb}$ of the kb-th frame of the reference pattern is so calculated by the use of $b_i^{kb}$ as to satisfy $d_i = 0$ within the range of $w_i^{kb}/2$. For example, the feature vectors obtained by analyzing the voices with the filter bank are expressed in terms of the strength of the spectra for each of frequencies $f_1, f_2, \ldots,$ and $f_n$. The letters A, B and W appearing in FIG. 2 designate the input, reference and deviation patterns, which are obtained by joining the points indicative of the strength of the first to n-th feature parameters (or the frequencies $f_1, f_2, f_3, \ldots, f_i, \ldots,$ and $f_n$), and these patterns which are connected sequentially in the order of the frames for the respective frames provide the input, reference and deviation patterns, respectively. FIG. 3 illustrates those three patterns which are sequentially indicated by the vectors composed respectively of an n number of feature parameters.

Figure 4:
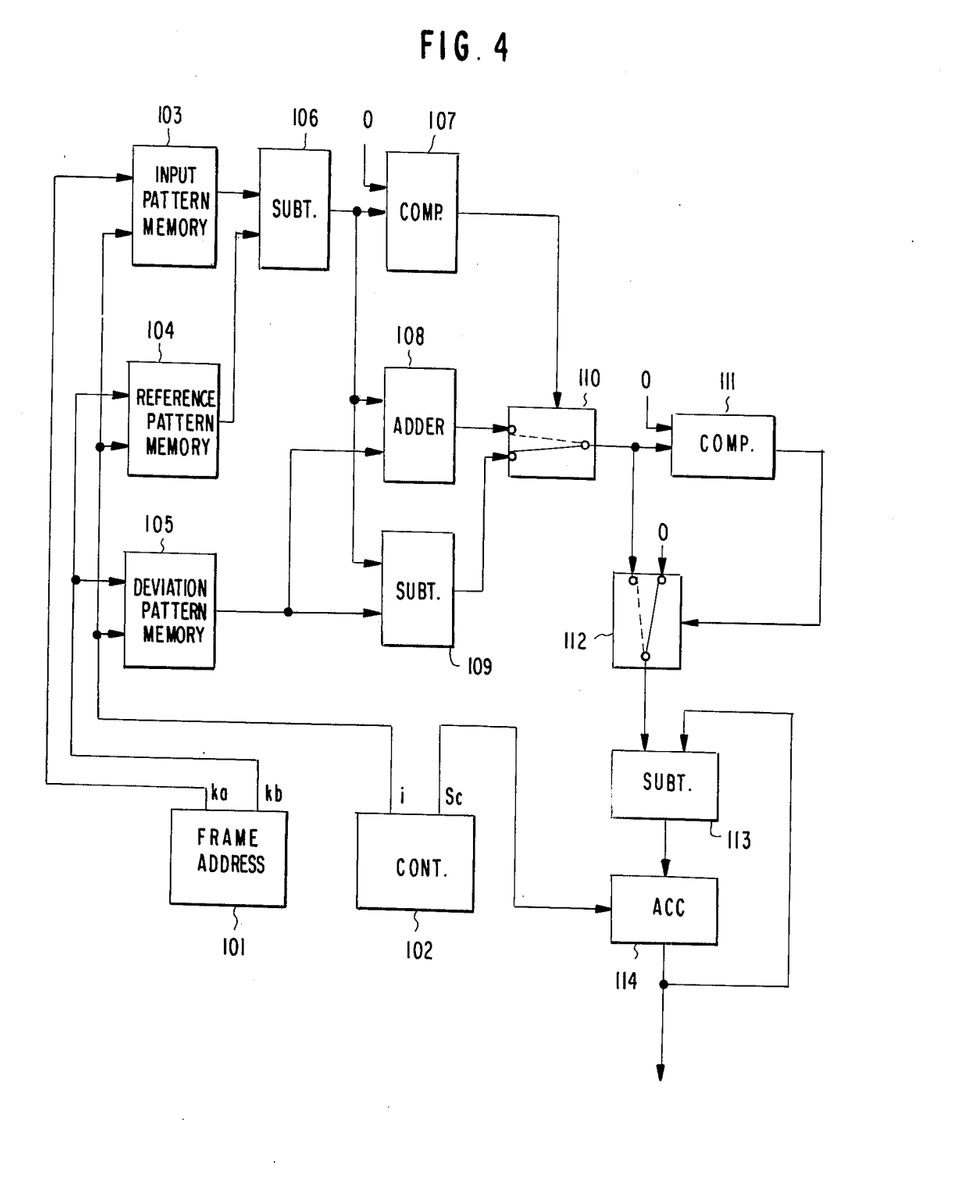
FIG. 4 is a block diagram illustrating the construction for performing the pattern distance calculations according to the present invention on the basis of the Chebychev distance.
Figure 5A:
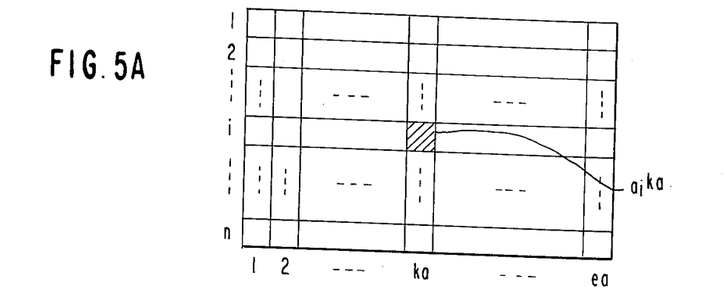
FIGS. 5A to 5C are storing forms of parameters in memories 103, 104 and 105.
Figure 5B:
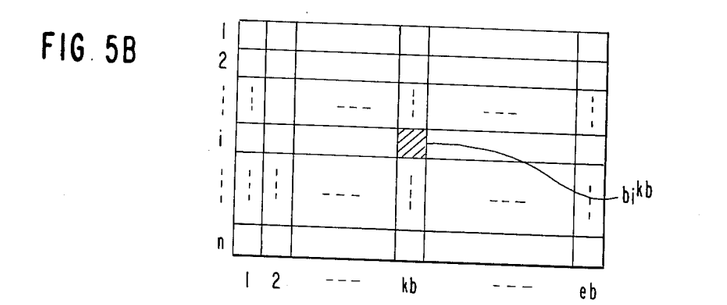
Figure 5C:
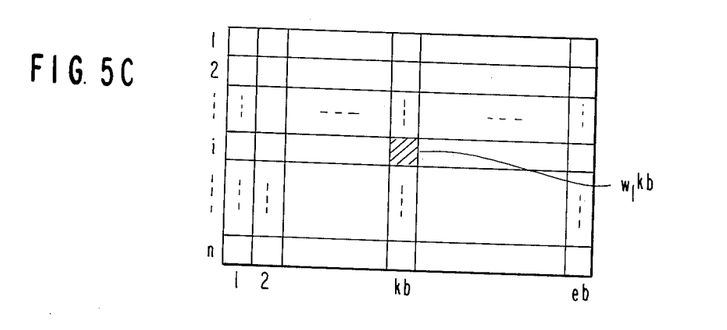

FIG. 4 is a block diagram illustrating one example of the construction of the system for executing the distance calculations expressed by the foregoing equations (8) to (10). An input pattern memory 103, a reference pattern memory 104 and a deviation pattern memory 105 are stored in matrix shapes, as illustrated in FIGS. 5A to 5C, with the input, reference and deviation patterns which are illustrated in FIG. 3. In FIGS. 5A to 5C, numerals in the transverse direction designate frame numbers whereas numerals in the longitudinal direction designate the numbers of the feature parameters. Therefore, the hatched portions appearing in FIGS. 5A, 5B and 5C respectively indicate the i-th feature parameter $a_i^{ka}$ in the ka-th frame of the input pattern, the i-th feature parameter $b_i^{kb}$ in the kb-th frame of the reference pattern, and the i-th feature parameter $w_i^{kb}/2$ of the kb-th frame of the deviation pattern.

Reverting to FIG. 4, the frame address signals ka and kb for the frame number assignment, which are to be used to read out the data of a predetermined frame from the respective memories 103, 104 and 105, are fed from a frame address assigning unit 101 to the input pattern memory 103, the reference pattern memory 104 and the deviation pattern memory 105. From a distance calculation control unit 102, there is generated a signal i which is used to read out a predetermined (i.e., i-th) feature parameter from each of the aforementioned memories. From the input pattern memory 103, the reference pattern memory 104 and the deviation pattern memory 105, therefore, the parameters $a_i^{ka}$, $b_i^{kb}$ and $w_i^{kb}/2$ are read out. A subtractor 106 receives the signal $a_i^{ka}$ and the signal $b_i^{kb}$ and feeds its output $(a_i^{ka} - b_i^{kb})$ to one of input terminals of a comparator 107, an adder 108 and a subtractor 109. On the other hand, the adder 108 and the subtractor 109 have their other input terminals fed with the deviation signal $w_i^{kb}/2$ which is read out of the deviation pattern memory 105. The comparator 107 receives a zero signal at its one input terminal and selectively feeds the output of the adder 108, when the output of the subtractor 106 is negative, and the output of the subtractor 109, in another case, to a comparator 111 and a switch 112 through the action of a switch 110. More specifically, this switch 110 selects the output of $W_i^{kb}/2 + (a_i^{ka} - b_i^{kb})$ for $a_i^{ka} - b_i^{kb} < 0$ and the output of $w_i^{kb}/2 - (a_i^{ka} - b_i^{kb})$ for $a_i^{ka} - b_i^{kb} \geq 0$. Accordingly the output of switch 110 may be represented as $w_i^{kb}/2 - |a_i^{ka} - b_i^{kb}|$. The comparator 111 performs such operations similar to those of the comparator 107 as to control the switch 112 so that the output of the switch 110 may be fed out to a subtractor 113 when it is negative whereas the signal indicative of zero may otherwise be fed to the subtractor 113. This subtractor 113 performs a subtraction between the signal stored in an accumulator 114 and the output of the switch 112 and stores the subtracted result in the accumulator 114. More specifically, the calculation expressed by (the value of the accumulator 114) $-(w_i^{kb}/2 - |a_i^{ka} - b_i^{kb}|) =$ (the value of the accumulator 114) $+(|a_i^{ka} - b_i^{kb}| - w_i/2)$ for $w_i^{kb}/2 - |a_i^{ka} - b_i^{kb}| < 0$, whereas the value of the accumulator 114 is unvaried for $w_i^{kb}/2 - |a_i^{ka} - b_i^{kb}| \geq 0$. The distance calculations control unit 102 clears the stored value of the accumulator 114 prior to the aforementioned distance calculations in response to a clear signals $S_c$. The distance calculations expressed by the equations (8) to (10) are performed by sequentially executing the foregoing operations for each of the feature parameters which are selected by the frame addresses and the feature parameter assigning signal.

As has been described hereinbefore, according to the present invention, the fluctuating range is given in advance as the deviation pattern for each feature parameter of the reference pattern so that the distance calculations are always performed by taking the fluctuating range into consideration. As a result, erroneous recognitions are significantly reduced as compared with the aforementioned conventional method in which the average pattern is used as the reference pattern. As compared with the method in which the plural reference patterns are prepared, moreover, an equivalent recognition rate can be achieved with less memory capacity and fewer calculations.

Although the embodiment thus far described is based upon the Chebychev distance expressed by the equations (8), (9) and (10), the present invention can also be applied to the distance calculations, which are based upon the Euclid distance expressed by the equation (2), as will be described in connection with the following equations (10), (11) and (12):

$$D_2 = F_2(A^{ka}, B^{kb}, W^{kb}) \tag{11}$$

$$D_2 = \sum_{i=1}^{n} d_{i2} \tag{12}$$

Figure 6:
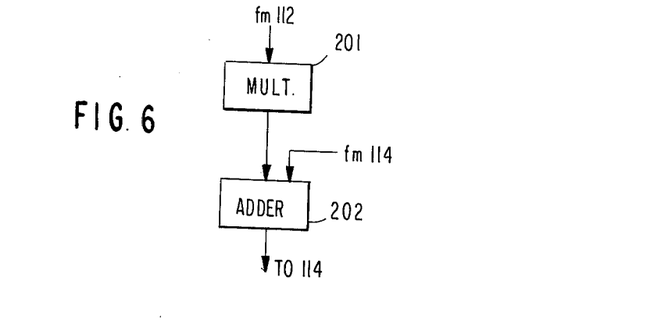
FIG. 6 is a block diagram illustrating the construction for performing the pattern distance calculations according to the present invention on the basis of the Euclid distance.

The construction for executing the above calculations is substantially similar to that shown in FIG. 4 and has the substractor 113 of FIG. 4 replaced by a multiplier 201 and an adder 202, both of which are shown in FIG. 6. In the embodiment shown in FIG. 4, the subtractor 113 performs the subtraction between the value of the accumulator 114 and the output of the switch 112, and the subtracted output is stored in the accumulator 114. In the embodiment of FIG. 6, on the contrary, the output of the switch 112 is squared by the multiplier 201, then this squared result is added to the value of the accumulator 114 by means of the adder 202 and the added result is stored in the accumulator 114. More specifically, the value of (the value of the accumulator $114) + (w_i^{kb}/2 - |a_i^{ka} - b_i^{kb}|)^2$ is stored in the accumulator 114 for $w_i^{kb}/2 - |a_i^{ka} - b_i^{kb}| < 0$, whereas the value of [(the value of the accumulator $114) + 0^2$] is stored in the accumulator 114 for $w_i^{kb}/2 - |a_i^{ka} - b_i^{kb}| \geq 0$.

Moreover, the distance calculations for defining the root of $$\sum_{i=1}^{n} d_i^2$$

as the distance may be performed by inserting a root calculating circuit into the output terminal of the accumulator 114 in addition to the construction of FIG. 6, as is expressed by the following equations:

$$D_3 = F_3(A^{ka}, B^{kb}, W^{kb}) \tag{13}$$

and $$D_3 = \sqrt{\sum_{i=1}^{n} d_{2i}^2} \tag{14}$$

Moreover, it is apparent that the present invention can be applied to all the distance calculations including the case in which the distance calculations expressed by the following equations (15), (16) and (17) are to be executed on the basis of the correlated distance which is defined by the foregoing equation (4):

$$D_4 = F_4(A^{ka}, B^{kb}, W^{kb}) \tag{15}$$

$$D_4 = \sum_{i=1}^{n} d_{4i} \tag{16}$$

$$d_{4i} = (a_i^{ka} - w_i^{kb}/2) \cdot b_i^{kb} \tag{17}$$

if $a_i^{ka} \geq b_i^{kb} + w_i^{kb}/2$, $$= (b_i^{ka})^2$$

if $|a_i^{ka} - b_i^{kb}| < w_i^{kb}/2$, $$= (a_i^{ka} + w_i^{kb}/2) \cdot b_i^{kb}$$

if $a_i^{ka} \leq b_i^{kb} - w_i^{kb}/2$.

Figure 7:
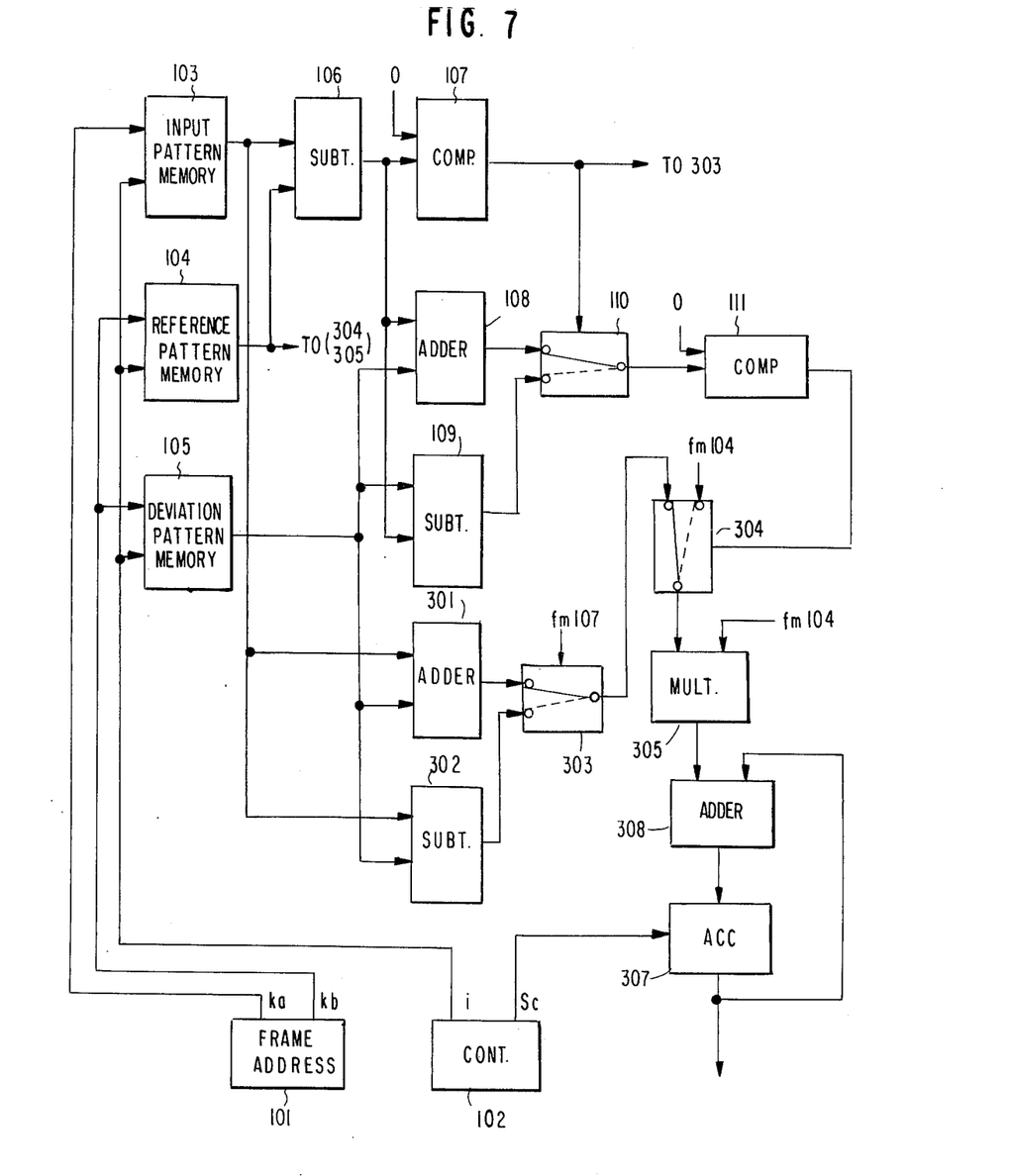
FIG. 7 is a block diagram illustrating the construction for performing the pattern distance calculations according to the present invention on the basis of the correlated distance.

This embodiment will be described with reference to FIG. 7. Like the embodiment of FIG. 4, the signals $a_i^{ka}$ and $b_i^{kb}$, which are read out of the input pattern memory 103 and the reference pattern memory 104, are subtracted in the subtractor 106. The comparator 107 controls the switch 110 such that the addition of the output of the subtractor 106 and the signal $w_i^{kb}/2$ read out of the reference pattern memory 105 is performed by the adder 108 when the output of the subtractor 106 is negative whereas the subtraction of the same two is performed by the subtractor 109 in another case. As a result, the output of the switch 110 takes the value of $w_i^{kb}/2 - |a_i^{ka} - b_i^{kb}|$. Moreover, an adder 301 and a subtractor 302 are fed with the parameter $a_i^{ka}$ from the input pattern memory 103 and the parameter $w_i^{kb}/2$ from the deviation pattern memory 105 so that a switch 303 is fed with the output of the adder 301, when the output of the subtractor 106 is negative, and the output of the subtractor 302, when the output of the subtractor 105 is positive, by the action of a switch 303 which is controlled by the switching signal coming from the comparator 107. As a result, the output of the switch 303 takes a value of $a_i^{ka} + w_i^{kb}/2$ for $a_i^{ka} - b_i^{kb} < 0$ and a value of $a_i^{ka} - w_i^{kb}/2$ for $a_i^{ka} - b_i^{kb} \geq 0$. Subsequently, the switch 304 is so controlled by the polarity of the output of the switch 110, as detected by the comparator 111, as to selectively generate the value of $a_i^{ka} + w_i^{kb}/2$ for $w_i^{kb}/2 - |a_i^{ka} - b_i^{kb}| < 0$ and the value $b_i^{kb}$ for $w_i^{kb}/2 - |a_i^{ka} - b_i^{kb}| \geq 0$. A multiplier 305 conducts the multiplication of the output of the switch 304 and the value $b_i^{kb}$ so that the distance $D^4$ of the equation (16) is determined by the actions of an adder 306 and an accumulator 307. The stored content of the accumulator 307 is cleared to zero in response to the clear signal $S_c$ similarly to the embodiment of FIG. 4.

Although, in the foregoing description, the spectra obtained by the filter bank are used as the feature parameters, an autocorrelation coefficient, Cepstrum, a linear predicting coefficient or the like can apparently be additionally used. Although the object to be recognized is voices, moreover, the present invention can be applied, as has been described hereinbefore, to all the recognition systems for judging the similarity from the distance including the characters.

What is claimed is:

1. A pattern distance calculating apparatus comprising:

an input pattern memory storing an input pattern comprised of a sequence of feature vectors each composed of a predetermined number n (i.e., a positive integer) of feature parameters;

a reference pattern memory storing a reference pattern comprised of a sequence of feature vectors each composed of n feature parameters of the same type as that of said input pattern;

a deviation pattern memory storing a deviation pattern indicative of a predetermined fluctuation range for each of said n feature parameters of said reference pattern; and distance calculating means for calculating a distance between said input pattern and said reference pattern, said distance calculating means comprising;

first means for determining if the difference between the value of each feature parameter of said input pattern and the value of the corresponding feature parameter of said reference pattern is within the fluctuation range for said feature parameter of said reference pattern, second means for selecting the value zero as a distance value if said difference is within said fluctuation range and for selecting a distance value determined by a preselected distance calculating formula if said difference is outside said fluctuation range, and means for accumulating said distance values selected for each parameter to provide said distance between said input pattern and said reference pattern.

2. A pattern distance calculating apparatus as claimed in claim 1 for use as a specified speaker recognition apparatus wherein said reference pattern and said deviation pattern represent patterns obtained from a specified speaker uttering a given word or words several times, said reference pattern representing an average pattern of said speaker's utterances and said deviation pattern representing the variations in the speaker's utterances, and wherein said input pattern represents an input utterance of said specified speaker.

3. A pattern distance calculating apparatus as claimed in claim 1 for use as an unspecified speaker recognition apparatus wherein said reference pattern and said deviation pattern represent patterns obtained from several speakers uttering a given word or words, said reference pattern representing an average pattern of said speaker's utterances and said deviation pattern representing the variations in the speaker's utterances, and wherein said input pattern represents an input utterance of an unknown speaker.

4. A pattern distance calculating apparatus according to claim 1, wherein said means for selecting another finite non-zero value comprises means for calculating and selecting a Chebychev distance between said input and reference feature parameters.

5. A pattern distance calculating apparatus according to claim 1, wherein said means for selecting another finite non-zero value comprises means for calculating and selecting a Euclid distance between said input and reference feature parameters.

6. A pattern distance calculating apparatus according to claim 1, wherein said means for selecting another finite non-zero value comprises means for calculating and selecting a correlated distance between said input and reference feature parameters.

7. A pattern distance calculating apparatus according to claim 1, wherein each of the feature parameters of said reference pattern is an average of a plurality of corresponding feature parameters included in a plurality of predetermined refernce patterns and each of said predetermined fluctuation range is the standard deviation of a plurality of corresponding feature parameters included in a plurality of said predetermined reference patterns.

8. A pattern distance calculating apparatus according to claim 1, wherein each of the feature parameters of said reference pattern is a center value of a plurality of corresponding feature parameters included in a plurality of predetermined reference patterns and each of said predetermined fluctuation range is the subtracted value of the maximum minus the minimum of a plurality of corresponding feature parameters included in a plurality of said predetermined reference patterns.

9. A pattern distance calculating apparatus according to claim 1, said distance calculating means comprising:

a first subtractor means for subtracting a reference feature parameter output of said reference pattern memory from an input feature parameter output of said input pattern memory;

a first adder means for adding the output of said first subtractor and the deviation parameter corresponding to said reference feature parameter output of said deviation pattern memory:

a second subtractor means for subtracting the output of said first subtractor means from said deviation parameter;

first switching means for selectively switching to its output terminal the output of said first adder means, when the output of said first subtractor means is negative, and the output of said second subtractor means when the output of said first subtractor means is zero or positive;

second switching means for selectively switching to its output a signal indicative of zero, when the output of said first switching means is zero or positive, and a signal indicative of the output of said first switching means, when the output of said first switching means is negative;

a third subtractor means for subtracting the output of said second switching means applied to a first input terminal from a signal applied to a second input terminal thereof; and an accumulator means for storing the output of said third subtractor means in an accumulated manner and for feeding its stored content to the second input of said third subtractor means.

10. A pattern distance calculating apparatus according to claim 1, said distance calculating means comprising:

a first subtractor means for subtracting a reference feature parameter output of said reference pattern memory from an input feature parameter output of said input pattern memory;

a first adder means for adding the output of said first subtractor and the deviation parameter corresponding to said reference feature parameter output of said deviation pattern memory:

a second subtractor means for subtracting the output of said first subtractor means from said deviation parameter;

first switching means for selectively switching to its output terminal the output of said first adder means, when the output of said first subtractor means is negative, and the output of said second subtractor means when the output of said first subtractor means is zero or positive;

second switching means for selectively switching to its output a signal indicative of zero, when the output of said first switching means is zero or positive, and a signal indicative of the output of said first switching means, when the output of said first switching means is negative;

a multiplier means for squaring the output of said second switching means;

a second adder means for adding the output of said multiplier means, applied to a first input thereof, and an input applied to a second input terminal thereof; and an accumulator means for storing the output of said second adder means in an accumulated manner and for feeding its stored value to the second input of said second adder means.

11. A pattern distance calculating apparatus according to claim 1, said distance calculating means comprising:

a first subtractor means for substracting a reference feature parameter output of said reference pattern memory from an input feature parameter output of said input pattern memory;

a first adder means for adding the output of said first subtractor means and the deviation parameter output of said deviation pattern memory which deviation pattern corresponds to said reference feature parameter;

a second subtractor means for subtracting the output of said first subtractor means from said deviation parameter;

first switching means for selectively switching to an output terminal the output of said first adder means, when the output of said first subtractor means is negative, and the output of said second subtractor means when the output of said first subtractor means is zero or positive;

a second adder means for adding said input feature parameter output of said input pattern memory and said deviation parameter output of said deviation pattern memory;

a third subtractor means for subtracting said deviation parameter from said input feature parameter;

second switching means for selectively switching to an output thereof the output of said third subtractor means when the output of said first subtractor means is zero or positive, and the output of said second adder means when the output of said first subtractor means is negative;

third switching means for selectively switching to an output thereof said reference feature parameter output of said reference pattern memory when the output of said first switching means is zero or positive, and the output of said second switching means when the output of said first switching means is negative;

a multiplier means for multiplying the output of said third switching means and said reference feature parameter output of said reference pattern memory;

a third adder means for adding the output of said multiplier means, applied to a first input thereof, and a signal applied to a second input thereof; and an accumulator means for storing the output of said third adder means in an accumulated manner and for feeding its stored value to the second input of said third adder.

12. A pattern distance calculating system in which the similarity between an input pattern composed of a sequence of feature vectors composed of a predetermined number n (i.e., a positive integer) of feature parameters and a reference pattern composed of a sequence of feature vectors composed of n feature parameters of the same type as that of said input pattern is calculated based on predetermined distance formulae including the respective feature parameters of said input pattern and the respective parameters of said reference pattern, wherein said distance is determined according to a deviation parameter representive of a predetermined fluctuation range for each of the parameters of said reference pattern such that the distance between said feature parameters of said input and reference patterns is set at zero or a predetermined value, when the value of the feature parameter of said input pattern at a certain time is within said fluctuation range of said reference pattern at a corresponding time, and at a value given by said predetermined formulae when said value is outside said fluctuation range.

* * * * *

UNITED STATES PATENT AND TRADEMARK OFFICE
CERTIFICATE OF CORRECTION

PATENT NO. : 4,601,054
DATED : July 15, 1986
INVENTOR(S) : Masao WATARI et al

It is certified that error appears in the above-identified patent and that said Letters Patent is hereby corrected as shown below:

Column 4, Line 24, delete "$A^{ae}$", and insert therefor --$A^{ea}$--.

Column 7, equation (12), delete "$D_2 = \sum_{i=1}^{n} d_{i2}$", and insert therefor --$D_2 = \sum_{i=1}^{n} di^2$--.

Column 8, Line 47, delete "$D^4$", and insert therefor --$D_4$--.

Column 10, Line 55, after "memory", delete ":" and insert therefor --;--.

Column 12, Line 41, after "predetermined", insert --distance--.

Signed and Sealed this

Third Day of March, 1987

Attest:

DONALD J. QUIGG

Attesting Officer

Commissioner of Patents and Trademarks